US012785162B2

(12) United States Patent
Weksler et al.

(10) Patent No.: US 12,785,162 B2
(45) Date of Patent: Nov. 3, 2026

(54) BATTERY WITH POP-UP MECHANISM TO VISUALLY INDICATE BATTERY MALFUNCTION AND/OR TO ELECTRICALLY DISENGAGE BATTERY FROM DEVICE

(71) Applicant: LENOVO (SINGAPORE) PTE. LTD., Singapore (SG)

(72) Inventors: Arnold Weksler, Morrisville, NC (US); Bouziane Yebka, Morrisville, NC (US); John C. Mese, Morrisville, NC (US); Nathan Peterson, Morrisville, NC (US); Russell Speight VanBlon, Morrisville, NC (US); Mark Delaney, Morrisvillr, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 751 days.

(21) Appl. No.: 18/320,884

(22) Filed: May 19, 2023

(65) Prior Publication Data

US 2024/0387890 A1 Nov. 21, 2024

(51) Int. Cl.
*H01M 10/48* (2006.01)
*H01M 50/392* (2021.01)
*H01M 50/574* (2021.01)

(52) U.S. Cl.
CPC ....... *H01M 10/488* (2013.01); *H01M 50/392* (2021.01); *H01M 50/574* (2021.01)

(58) Field of Classification Search
None
See application file for complete search history.

(56) References Cited

U.S. PATENT DOCUMENTS 6,143,440 A * 11/2000 Volz .................... H01M 50/578 429/61
2023/0012294 A1* 1/2023 Zbiral ................ H01M 50/204

FOREIGN PATENT DOCUMENTS

CN 105070969 A * 11/2015 .......... H01M 10/484
CN 112563646 A * 3/2021 .......... H01M 10/484

OTHER PUBLICATIONS

CN-112563646-A English machine translation (Year: 2021).*
CN-105070969-A English machine translation (Year: 2015).*
Weksler et al., "Battery With Material on Exterior of Casing to Absorb Matter From Inside Battery and Dislodge Battery From Electrical Contact(s)", file history of related U.S. Appl. No. 18/320,509, filed May 19, 2023.

* cited by examiner

*Primary Examiner* — Ula C Ruddock
*Assistant Examiner* — Maria F Orozco
(74) *Attorney, Agent, or Firm* — John M. Rogitz; John L. Rogitz

(57) ABSTRACT

In one aspect, an apparatus includes a battery. The battery includes at least one battery cell, a casing that houses the at least one battery cell, and a mechanism inside the casing. The mechanism includes a shaft that moves within the casing based on leakage of matter from the battery cell to outside the casing.

20 Claims, 14 Drawing Sheets

Dry Polymer Absorbent Ring

BATTERY WITH POP-UP MECHANISM TO VISUALLY INDICATE BATTERY MALFUNCTION AND/OR TO ELECTRICALLY DISENGAGE BATTERY FROM DEVICE

FIELD

The disclosure below relates to technically inventive, non-routine solutions that produce concrete technical improvements. In particular, the disclosure below relates to batteries with pop-up mechanisms to visually indicate battery malfunction and/or electrically disengage the batteries from the devices in which they are disposed.

BACKGROUND

As recognized herein, batteries might begin to leak toxic matter but still have enough voltage to continue powering the device in whey they are disposed. In the meantime, the user might not know about the leak, which is particularly true for devices that do not monitor their own battery health, such as flashlights, remote controls, radios, and many other "dummy" household devices. In such situations, the user might not discover the leak until after the device stops working and only then discover that the leak has permanently damaged the device itself (e.g., damaged the device's electrical contacts so that the device can no longer be powered by healthy replacement batteries). Not only that, but when attempting to remove the leaking battery, the user might be exposed to harmful agents that have leaked from the battery, compromising the user's health. There are currently no adequate solutions to the foregoing technological problems.

SUMMARY

Accordingly, in one aspect, an apparatus includes a battery. The battery includes at least one battery cell, a casing housing at least one battery cell, and a mechanism inside the casing. The mechanism includes a shaft that moves within the casing based on the leakage of matter from the battery cell to outside the casing.

In certain example implementations, the shaft may be configured to electrically disengage the battery from a device based on the movement of the shaft based on the leakage. Also, in certain example implementations, the shaft may be configured to extend a component of the battery away from the casing based on the movement of the shaft based on the leakage. The component may include at least part of the shaft and, as extended away from the casing, may establish a visual indicator appreciable from outside the casing without deconstructing the battery. The visual indicator may indicate a battery malfunction, and in certain specific non-limiting examples, the component as extended away from the casing may bear red coloring to indicate the battery malfunction.

The mechanism may also include an element with an opening through which the shaft extends, where the element may be configured to expand the opening based on the leakage to permit the shaft to move within the casing based on the leakage. In certain specific examples, the shaft may have a first width along a first portion of the shaft and a second width along a second portion of the shaft, with the second width being larger than the first width. The element may thus be configured to expand the opening based on the leakage to permit the second portion to move within the casing to extend a component of the battery away from the casing, where the second portion cannot pass through the opening prior to the opening's expansion based on the leakage. The second portion might therefore abut the element around at least a portion of the opening prior to the opening's expansion based on the leakage.

However, in other examples prior to the opening's expansion based on the leakage, the opening may establish an interference fit with the shaft. The interference fit may prevent movement of the shaft within the casing. Then based on the opening's expansion based on the leakage, the shaft may move within the casing.

In either case, the element itself may be ring-shaped in certain non-limiting examples. Additionally, the element may be established at least in part by a polymer. The matter itself that leaks out of the battery may include electrolyte, and in certain examples, the apparatus itself may even include a device that houses the battery.

In another aspect, an apparatus includes a mechanism configured for disposition within a battery. The mechanism includes a shaft configured to move within a casing of the battery based on leakage of matter from the battery cell to outside the casing.

The mechanism may also include an element with an opening configured for receiving the shaft. The element may be configured to expand the opening based on leakage of electrolyte out of a battery cell of the battery to permit the shaft to move within the opening based on the leakage. Additionally, an end portion of the shaft may be configured with an indicator of electrolyte leakage.

In still another aspect, a method includes providing a battery that includes at least one battery cell and a casing housing at least one battery cell. The method also includes providing a pop-up mechanism inside the casing, where the pop-up mechanism includes a shaft that moves within the casing based on leakage of matter from the battery cell to outside the casing.

The details of present principles, both as to their structure and operation, can best be understood in reference to the accompanying drawings, in which like reference numerals refer to like parts and in which:

DETAILED DESCRIPTION

Figure 1:
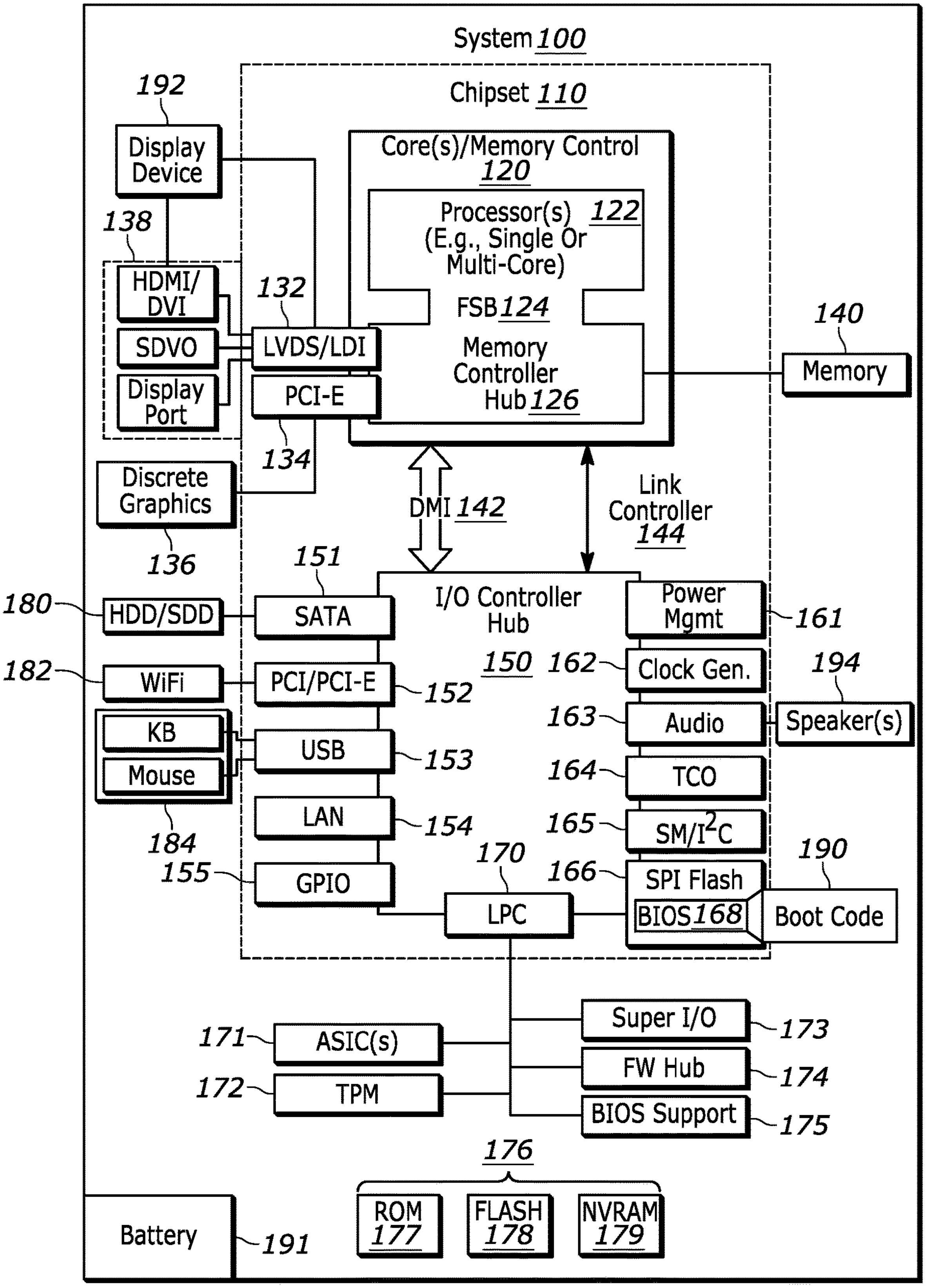
FIG. 1 is a block diagram of an example system that houses a battery and is powered by the battery consistent with present principles.

Among other things, the detailed description below deals with making a user aware of battery leakage, including for devices that do not monitor battery health themselves. For example, present principles may be used for batteries in flashlights, television remote controls and other types of remote controls, AM/FM/XM radios, etc. However, present principles may also be used for batteries in smart devices that monitor battery health at the battery management unit (BMU) level, CPU level, etc. as well.

In any case, apparatuses and methods are disclosed to recognize a battery leak and initiate swelling of material on the battery to dislodge the battery and hence move the battery away from electrical contacts in the device itself. This, in turn, helps to avoid electrical shorts and additional (and sometimes permanent) damage to the device, like damage to the device's electrical contacts themselves, while also improving user safety in handling a malfunctioning battery. Thus, although sometimes batteries might begin leaking and still have sufficient voltage to continue powering the device itself, using principles set forth below, the device may stop working sooner and therefore prevent this leaking from worsening while the device itself might still otherwise be powered. In so doing, the user may also be made aware of the leakage owing to the device becoming nonfunctional, prompting the user to investigate further. Principles set forth below may therefore improve on existing "dumb" batteries/household devices that do not have the capability to do active battery monitoring themselves (and still also provide improvements to devices that may, in fact, do so).

Accordingly, in one example implementation, a battery may be wrapped with a very thin layer of material at the positive and negative terminals of the battery. As the leak begins, the battery leak will cause a chemical reaction with the material that will push the battery away from the device's electrical contacts to avoid further damage. The material may thus be a swelling electrolyte-absorbent material that triggers a fail-safe mechanism by ejecting the battery and/or disconnecting the battery from the terminals.

As one specific example, present principles may be used for batteries with lead acid battery chemistry, including lead acid batteries built with several individual cells containing layers of lead alloy plates immersed in an electrolyte solution and made of 35% Sulfuric acid ($H_2SO_4$) and 65% water (as an example). Therefore, the material that is used to absorb the electrolyte may be a water-absorbent material (e.g., instead of an acid-absorbent material, though the material to absorb the acid itself may additionally or alternatively be used in certain examples).

Thus, in various example embodiments, the material may be a super absorbent polymer like sodium polyacrylate (formula: $(C_3H_3NaO_2)_n$) and/or polyacrylamide crystals (formula: $C_3H_5NO)_n$). Thus, while such polymers may be somewhat different in super-absorption and absorption rate, they each effectively absorb water and expand since they are hydrophilic (water-loving), non-toxic cross-linked polymers that can absorb several hundred times their weight in water but cannot dissolve because of their three-dimensional polymeric network structure. Yet still, the polymer may also exhibit solid-like properties due to the network formed by the cross-linking reaction. Composed of potassium, carbon, and/or nitrogen, the excessive swelling/expansion capabilities of these types of example polymers can be used as the disconnection mechanism. What's more, the material can continue to hold/maintain the water/electrolyte when squeezed or put under pressure, further aiding present principles.

As another example to make the user aware of battery leakage and even electrically disconnect the battery from the device itself, a mechanism internal to the battery may operate to produce a pop-up indicator of battery malfunction. When actuated, the pop-up mechanism may also break a current path of power from the battery to the device itself, rendering the battery permanently inoperable (and the device itself inoperable until a replacement battery is installed). This mechanism may also help avoid electrical shorts and additional (and sometimes permanent) damage to the device while improving user safety in handling a malfunctioning battery. This mechanism may be used in combination with the external absorbent material or by itself.

Prior to delving further into the details of the instant techniques, note with respect to any computer systems discussed herein that a system may include server and client components connected over a network such that data may be exchanged between the client and server components. The client components may include one or more computing devices, including televisions (e.g., smart TVs, Internet-enabled TVs), computers such as desktops, laptops, and tablet computers, so-called convertible devices (e.g., having a tablet configuration and laptop configuration), and other mobile devices including smartphones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, control lines, registers, and shift registers. Moreover, any logical blocks, modules, and circuits described herein can be implemented or performed with a system processor, a digital signal processor (DSP), a field programmable gate array (FPGA), or other programmable logic devices such as an application-specific integrated circuit (ASIC), discrete gate or transistor logic, discrete hardware components, or any combination thereof designed to perform the functions described herein. A processor can also be implemented by a controller or state machine, or a combination of computing devices. Thus, the methods herein may be implemented as software instructions executed by a processor, suitably configured application-specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as a system 100 described below, such an application may also be downloaded from a server to a device over a network such as the Internet.

Software modules and/or applications described through flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic, when implemented in software, can be written in an appropriate language such as but not limited to a hypertext markup language (HTML)-5, Java®/JavaScript, C# or C++, and can be stored on or transmitted from a computer-readable storage medium such as a hard disk drive (HDD) or solid-state drive (SSD), a random access memory (RAM), read-only memory (ROM), electrically erasable programmable read-only memory (EEPROM), a hard disk drive or solid-state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer-readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines for the presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments, the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized devices.

As shown in FIG. 1, system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on the brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under the direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independently of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing, or reading and writing information on one or more drives 180 such as HDDs, SDDs, or a combination thereof, but in any case, the drives 180 are understood to be, e.g., tangible computer-readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice, and various other devices (e.g., cameras, phones, storage, media players, etc.).

In the example of FIG. 1, the LPC interface 170 provides for the use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a battery 191, such as a single-cell battery or battery pack with multiple cells. In addition to containing one or more battery cells, the battery 191 may include its own one or more processors, such as a microprocessor or any other type of processor that might be provided as part of a gas gauge or battery management unit (BMU) for the battery 191. Non-transitory storage may also be included in the battery 191, with the storage storing firmware used to monitor the battery 191 and perform other functions. Random access memory (RAM) and other components may also be included in the battery 191, such as one or more sensors for sensing/measuring things related to the battery 191 and/or battery cells within, such as temperature, voltage, electric potential, age, impedance, state of charge, etc. Thus, these sensors may provide input/measurements to the processor(s) within the battery 191 and/or the processor(s) 122.

Additionally, note that one or more battery cells within the battery 191 may be configured in jellyroll format. The cells may also be configured in pouch cell format in which the strip(s) of active materials are folded or in a stacked format if desired. Regardless, the battery cells may be Lithium-ion battery cells, alkaline-based battery cells, acid-based battery cells, and/or other types of battery cells consistent with present principles.

It is to be further understood, consistent with present principles, that the battery 191 may be electrically coupled to and power the system 100, and/or individual components thereof, using battery power. The system 100, and/or battery 191 in particular, may also be electrically coupled to at least one charge receiver on the system 100 for receiving a charge via an AC/DC power supply connected to an AC power source (e.g., a wall outlet providing AC power) to charge the one or more battery cells in the battery 191. Thus, the charge receiver may include at least one circuit configured for receiving power from a wall outlet (or other AC power source) via the power supply and then providing power to the system 100 to power it and also providing power to the battery 191 to charge the cells within the battery 191. In some examples, wireless charging using a wireless charge receiver and wireless charge transmitting pad may be used.

Notwithstanding the foregoing, it is to be understood that a battery consistent with present principles need not necessarily be a smart battery as set forth above and may instead be established by one or more battery cells while not including a processor, storage, and even a charging circuit as mentioned above.

In any case, though not shown for simplicity, it is to be understood that in some embodiments the system 100 may further include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures the directional movement of the system 100 and provides related input to the processor 122.

Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood, at least based on the foregoing, that the system 100 is configured to undertake present principles.

Moving on from FIG. 1, note consistent with present principles that each battery cell of a battery consistent with the present principles may include an anode, a cathode, and an electrolyte between the anode and the cathode.

The battery may also include a casing housing the battery cell(s) as well as material coupled to an exterior of the casing. For example, the material may be disposed on, wrapped around, integrated with, or otherwise in physical contact with the battery casing (and be exposed to external elements). The material may be configured to absorb matter (e.g., electrolyte and/or other matter) from at least one battery cell based on the matter leaking externally from inside the casing, with the material expanding based on the material absorbing the matter.

For example, recognizing that an electrolyte is often at least partially composed of water ($H_2O$), the material may be one that absorbs water from the electrolyte. Thus, the material may be a polymer such as a crosslinked polymer (e.g., a hydrophilic three-dimensional polymeric network structure). The material may therefore include sodium polyacrylate and/or polyacrylamide crystals, for example, though other suitable materials may also be used, including those that might absorb other parts of the electrolyte (or other internal battery matter) besides water.

Further note that at least prior to absorbing matter, the material may be electrically conductive so that if, for example, the material is coupled to an external surface of a battery terminal, the battery itself may still transfer power to/from an electrical contact with which it has been engaged despite the intervening material. Accordingly, in one example, the material may be manufactured as a flat sheet for wrapping or other physical engagement with the external surface of the casing of the battery (and/or other external surfaces) consistent with present principles.

What's more, note that a battery consistent with present principles may be a lead acid battery, alkaline battery, lithium-ion battery, or another type of battery. Also, the battery may be rechargeable or single-use. Also, note that the electrolyte in the battery may be non-dry in various non-limiting examples.

With the foregoing in mind, various example embodiments will now be described. Beginning first with FIGS. 2-4, these figures show batteries with cylindrical casings. As such, the batteries of these figures may be AA batteries, AAA batteries, C batteries, D batteries, etc.

Figure 2:
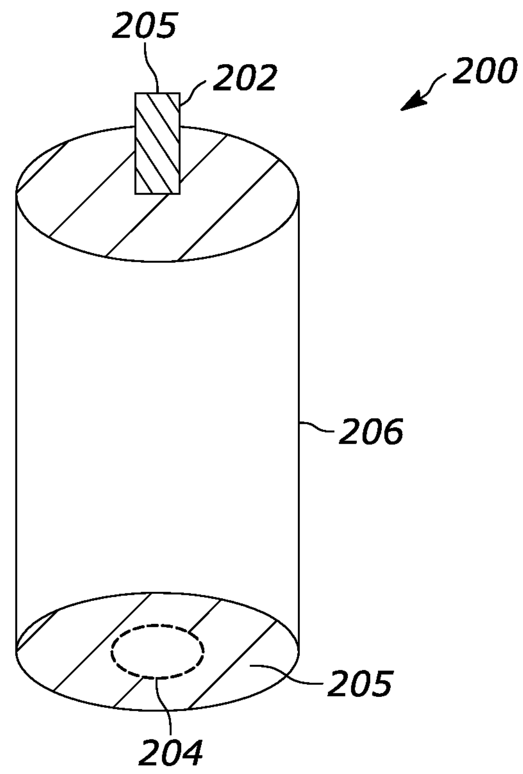
FIGS. 2-4 show perspective views of example implementations of a cylindrical battery with material coupled to an exterior of the battery casing to absorb electrolyte from the battery when malfunctioning and leaking electrolyte consistent with present principles.

With reference to FIG. 2, a perspective view of a battery 200 is shown. The battery 200 may have a positive terminal 202 and negative terminal 204 coupled to or forming part of a casing 206 that encapsulates one or more battery cells. Note that the terminal 204 is shown in a cutaway view here. Shading at the positive and negative end portions/ends of the battery 200 (including the terminals 202, 204 and surrounding horizontal surfaces) represent material 205 as described above (e.g., a polymer) that may cover, wrap-around, be pressed into, engrained with, or otherwise be coupled to external surfaces of the ends that would otherwise be fully exposed to elements external to the battery. Thus, should electrolyte or other matter leak out of the casing 206 of the battery 200 at or near the ends of the battery 200, the material 205 may absorb the matter and expand as a result. This in turn may push or otherwise move one or both of terminals 202, 204 away from respective positive and negative electrical contacts of a device in which the battery 200 has been disposed, with power otherwise being provided to the device from the battery 200 via the contacts.

Accordingly, when the device ceases to be powered by the battery 200 based on the absorption of the matter by the material 205 and the corresponding movement of the battery 200 away from one or more of the electrical contacts based on the expansion of the material 205 (thus electrically disengaging the battery 200 from the device itself), the user may be notified of an issue that should be investigated since the device will become nonfunctional/inoperable and the user would then attempt to find out why by checking the battery 200 to possibly replace it. In this way, the battery 200 may be removed from the device and discarded before further leakage of the electrolyte occurs, minimizing damage to the device itself and minimizing potential safety hazards that the user would encounter when attempting to fully remove the battery 200 from the device at a later time when a greater amount of potentially harmful internal matter from the battery 200 has leaked out. Note that the device itself might be, for example, a flashlight, a television remote control, an AM/FM/XM radio, a home cooking appliance, an Internet of things (IoT) device, a lantern, etc.

Figure 3:
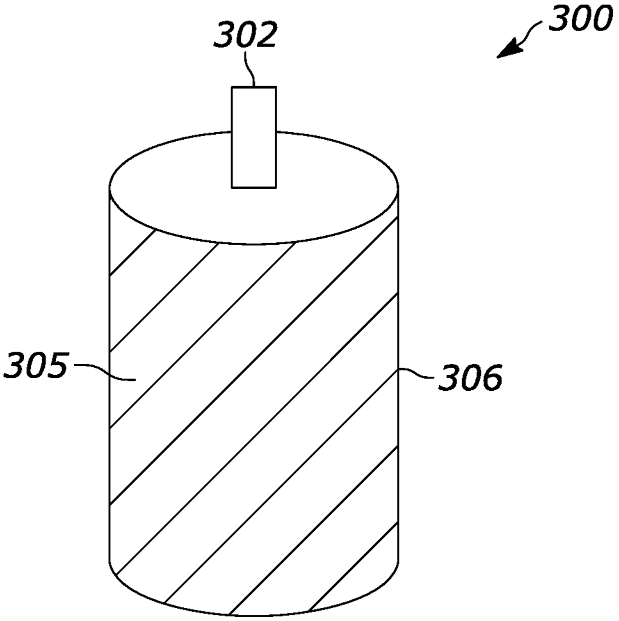

FIG. 3 shows a perspective view of another example cylindrical battery 300. The battery 300 may have a positive terminal 302 and a negative terminal (not shown) coupled to or forming part of a casing 306 that encapsulates one or more battery cells. Shading along the external vertical cylinder walls of the battery 300 represents material 305 as described above (e.g., a polymer) that may cover, wrap-around, be pressed into, engrained with, or otherwise be coupled to rounded cylindrical surfaces/sidewalls that would otherwise be fully exposed. Thus, should electrolyte or another matter leak out of the battery 300 and come into contact with the material 305, the material 305 may absorb the matter and expand. So here too, this may push or otherwise move one or both of the positive and negative terminals of the battery 300 away from the respective positive and negative electrical contacts of a device in which the battery 300 has been disposed, with power otherwise being provided to the device from the battery 300 via the contacts.

Accordingly, when the device ceases to be powered by the battery 300 based on the absorption of the matter by the material 305 and the corresponding movement of the battery 300 away from one or more of the electrical contacts based on the expansion of the material 305, the user may be notified of an issue that should be investigated since the device will become nonfunctional and the user would then attempt to find out why by checking the battery 300 to possibly replace it. In this way, the battery 300 may be removed from the device and discarded before further leakage of the electrolyte occurs, minimizing damage to the device itself and minimizing potential safety hazards that the user would encounter when attempting to fully remove the battery 300 from the device at a later time when a greater amount of potentially harmful internal matter from the battery 300 has leaked out. Again note that the device itself may be any of those described herein (e.g., a flashlight, a television remote control, etc.).

Figure 4:
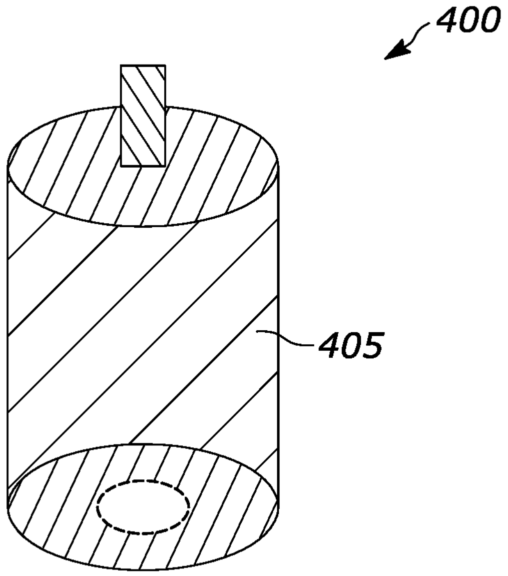

FIG. 4 then shows another example. Per FIG. 4, a cylindrical battery 400 may have material 405 wrapped around all external surfaces, as shown. So, for example, the embodiments of FIGS. 3 and 4 may be combined.

Figure 5:
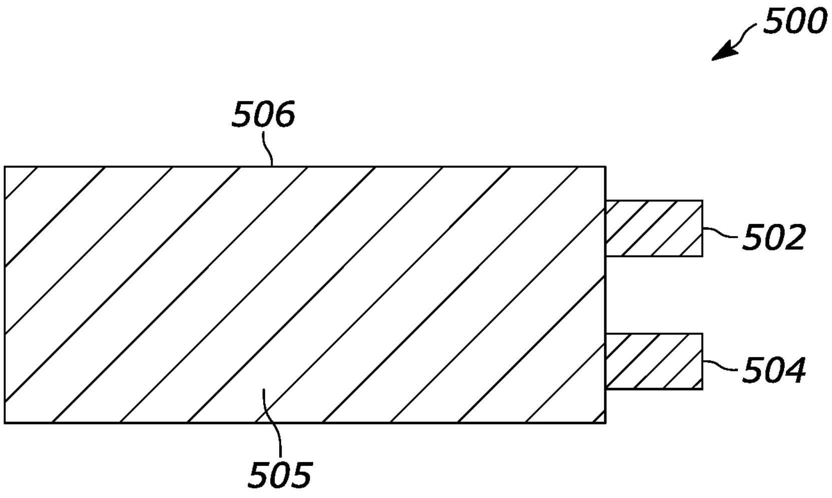
FIG. 5 shows a top plan view of an example implementation of a pouch cell battery with material coupled to an exterior of the battery casing to absorb electrolyte from the battery when malfunctioning and leaking electrolyte consistent with present principles.

Turning now to FIG. 5, an example pouch battery 500 is shown. Material 505, consistent with present principles, may be coupled to one or more external surfaces of the pouch battery, including positive terminal 502, negative terminal 504, and casing 506. Note that the casing 506 may be non-rigid in certain examples, in contrast to the rigid cylindrical casings of FIGS. 2-4 described above. Thus, should matter from inside the battery 500 leak out, the material 505 may absorb the matter and force the terminals 502 and 504 away from electrical contacts with which they have been engaged to otherwise power a connected device (e.g., laptop computer or smartphone), breaking the electrical connection between the battery 500 and device itself and thus rendering the device inoperable (or at least not able to be powered by power from the battery 500 even if still receiving power from a wall outlet via an AC adapter). Accordingly, the user may be notified of a potential issue with the battery 500 owing to the battery 500 rendering the device inoperable. Or in the case of a laptop or other device that might be connected to another power source, the laptop may detect the disconnection of the battery 500 itself and present a visual/display notification to the user of such to thus prompt the user to take action (e.g., remove/replace the battery 500 to minimize/prevent further damage to the laptop from further leakage of the matter into the battery housing on the device).

Figure 6:
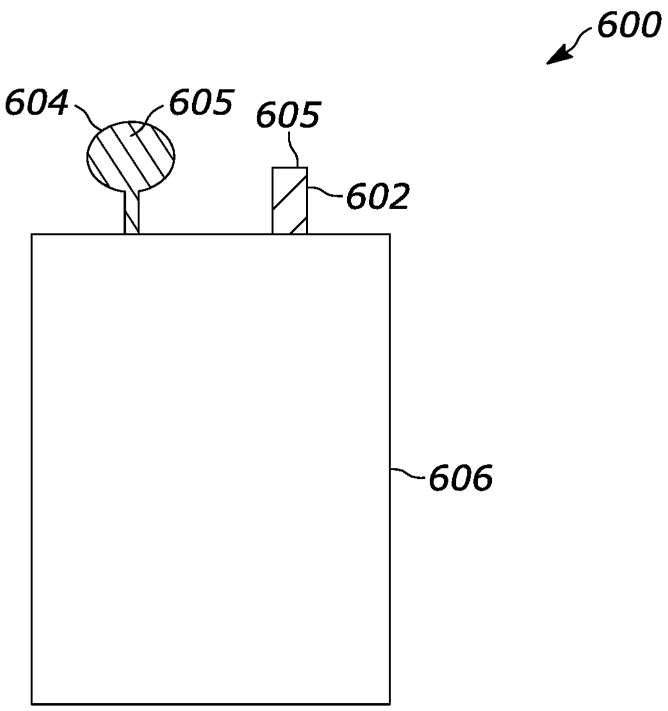
FIG. 6 shows a side elevational view, and FIG. 6A a top plan view, of an example implementation of a rectangular prism-shaped 9-volt battery with material coupled to an exterior of the battery casing to absorb electrolyte from the battery when malfunctioning and leaking electrolyte consistent with present principles.
Figure 6A:
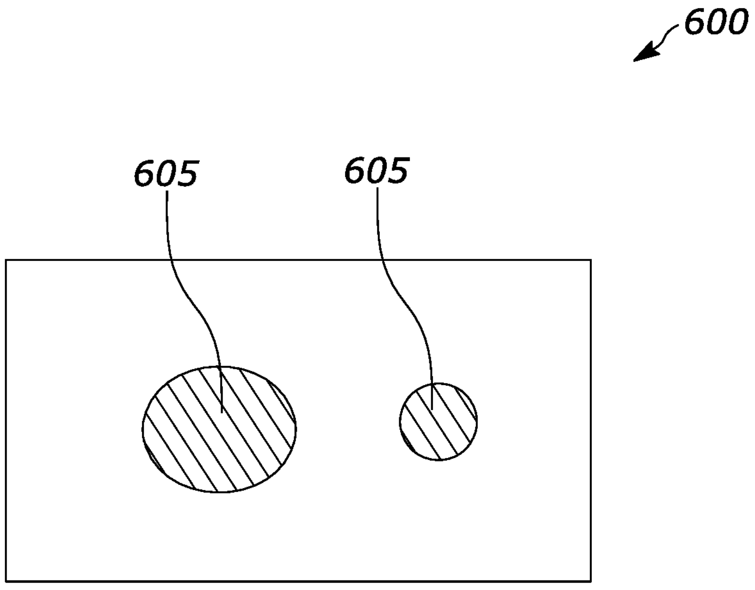

FIG. 6 shows a front elevational view of an example rectangular prism-shaped battery 600, such as a 9-volt battery. As shown, electrolyte-absorbent material 605, consistent with present principles, may be coupled to external surfaces of the positive terminal 602 and negative terminal 604, including exposed surfaces of the terminals 602, 604 on inner and lower walls of the terminals 602, 604 that are down in the holes of the terminals 602, 604 themselves as shown in the top plan view of FIG. 6A. Additionally, though not shown, note that the material 605 may be coupled to other external surfaces of the battery casing 606 as well. Thus, similar to as set forth above, electrical contacts of a device being powered by the battery 600 may be forced away from the terminals 602, 604 (e.g., even if already engaged therewith via snap or interference fit) based on the absorption of internal mattery of the battery 600 by the material 605.

Figure 7:
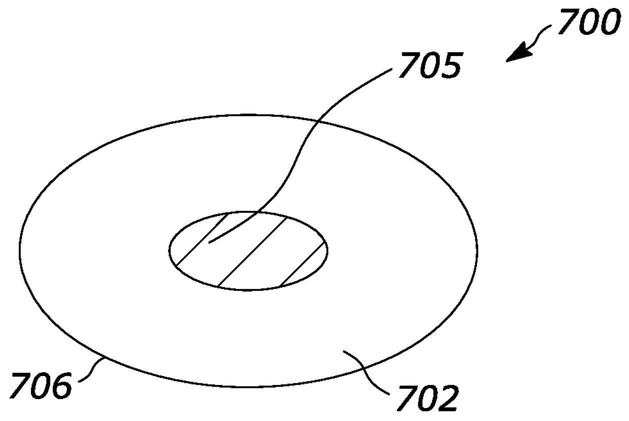
FIG. 7 shows a top plan view of an example implementation of a coin battery with material coupled to an exterior of the battery casing to absorb electrolyte from the battery when malfunctioning and leaking electrolyte consistent with present principles.

Turning to FIG. 7, an example coin battery (sometimes referred to as a "watch battery") 700 is shown. The battery has a negative terminal 702 and a positive terminal (not shown). Material 705, as described herein, may be coupled to the terminal(s) to absorb matter from inside the battery when the matter leaks outside to thus force the terminal(s) away from electrical contacts with which they have been engaged, such as electrical contacts in a battery housing of the device like an electronic wristwatch, vehicle key fob, hearing aid, etc. The device becoming nonoperational may thus prompt the user to investigate and change the battery before further leakage occurs and severe damage to the electrical contacts and/or battery housing in the device occurs. And note here for completeness that as with other embodiments discussed above, for further absorption coverage to further aid in breaking the electrical connection between the battery and electrical contacts, the material 705 may be coupled to other external surfaces of the battery casing 706 as well to absorb matter wherever it might leak out of the battery 700 (e.g., based on the battery rupturing from a sidewall or even being punctured by an external object).

Figure 8:
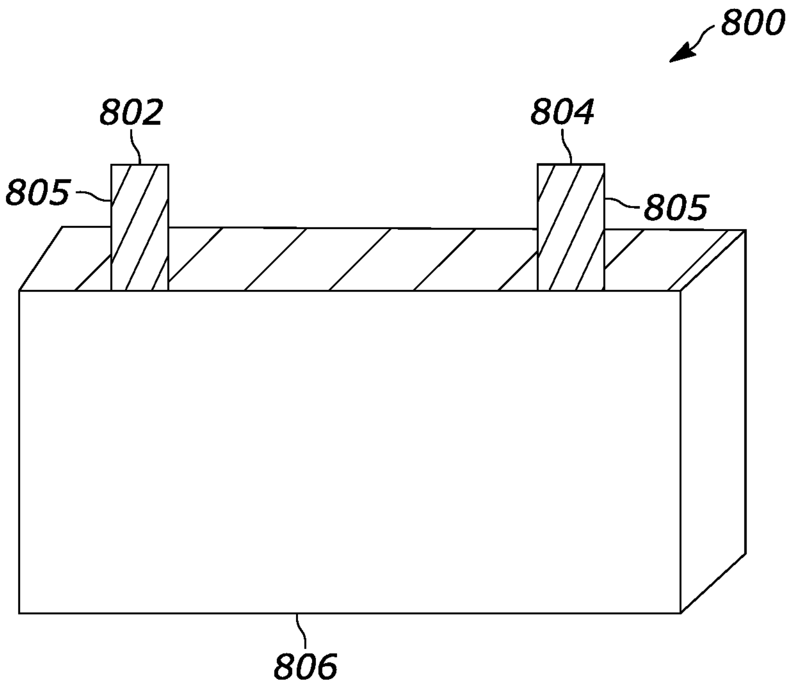
FIG. 8 shows a perspective view of an example implementation of a lead acid rectangular prism-shaped vehicle battery with material coupled to an exterior of the battery casing to absorb electrolyte from the battery when malfunctioning and leaking electrolyte consistent with present principles.

FIG. 8 shows an example lead acid vehicle battery 800. Consistent with present principles, positive and negative terminals 802 and 804 may bear, on external surfaces, electrolyte-absorbent material 805 as described above. A top/upper face of the battery's casing 806 may also bear the material 805. Thus, should electrolyte or other matter from inside the battery 800 begin leaking out, the material 805 on the terminals 802, 804 may force the electrical contacts/wires of the vehicle's power system radially away from the terminals 802, 804, thereby breaking the electrical connection. Additionally, the material 805 on the upper face may force the contacts vertically up and away from the terminals 802 and 804 upon absorption of battery matter at those portions, also helping to break the connection.

Figure 9A:
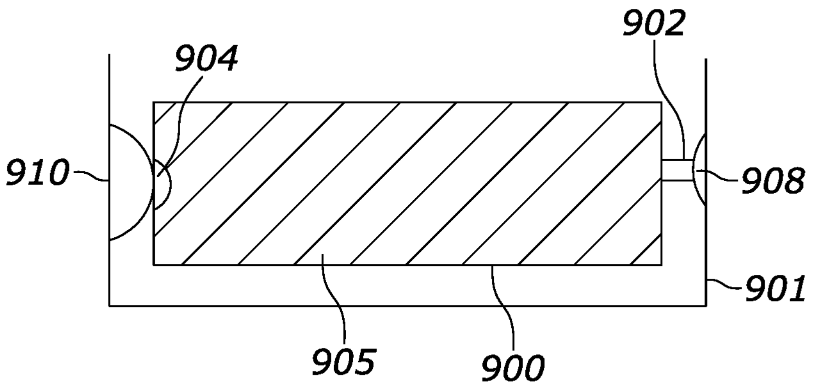
FIGS. 9A, 9B, 10A, and 10B illustrate a cylindrical battery's external material absorbing leaked electrolyte to electrically disconnect the battery from the device housing the battery by moving the battery away from the device's electrical contacts consistent with present principles.
Figure 9B:
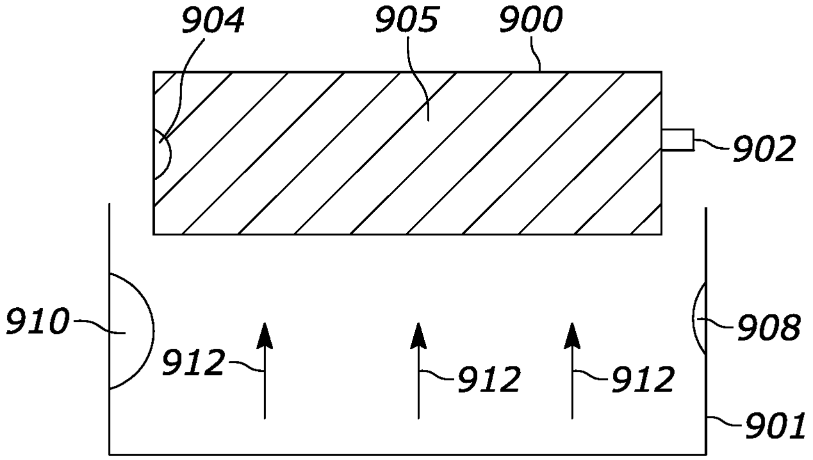

FIGS. 9A and 9B illustrate how a cylindrical battery 900, as described above, may be dislodged at least partially out of a housing 901 of a device being powered by the battery 900. As shown, material 905, as described herein, has been wrapped around the external sidewalls of the battery 900. FIG. 9A illustrates how the battery 900 may remain in place when functioning properly, with positive and negative terminals 902, 904 electrically/physically in contact with electrical contacts 908 and 910 of the housing 901 to power the device. Then per FIG. 9B, responsive to the material 905 absorbing matter that has leaked out of the battery 900, the material 905 may expand to force the battery 900 linearly upward and at least partially out of its position in the housing 901 as illustrated by linear movement arrows 912 to thus electrically disengage the battery 900 from the contacts 908, 910.

Figure 10A:
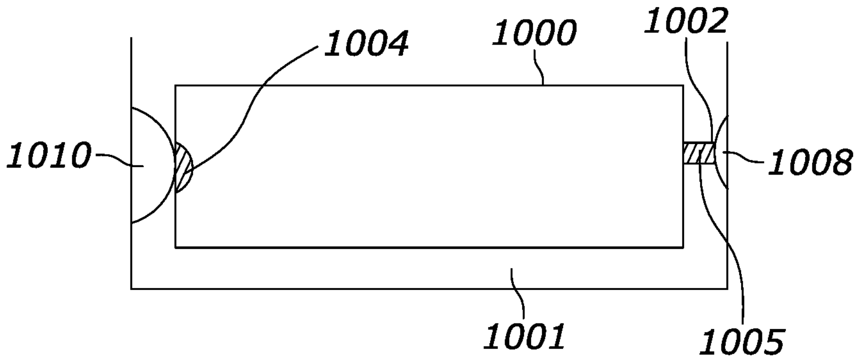
Figure 10B:
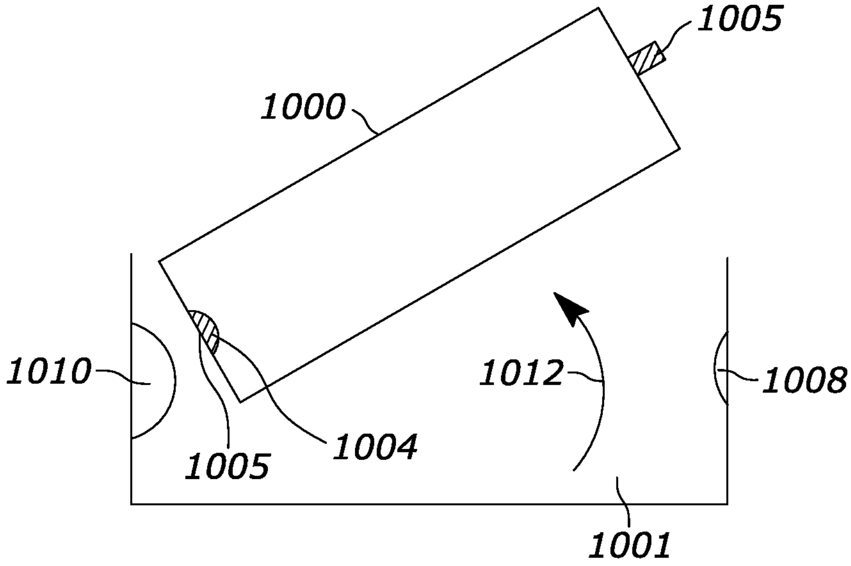

FIGS. 10A and 10B also illustrate how a cylindrical battery 1000 as described above, may be dislodged out of a housing 1001 of a device being powered by the battery 1000. As shown, material 1005, as described herein, covers the external surfaces of positive and negative terminals 1002 and 1004 of the battery 1000. FIG. 10A illustrates how the battery 1000 may remain in place when functioning properly with the positive and negative terminals 1002 and 1004 electrically/physically in contact with electrical contacts 1008 and 1010 of the housing 1001 to power the device. Then per FIG. 10B, responsive to the material 1005 absorbing matter that has leaked out of the battery 1000 at an end portion of the battery 1000, the material 1005 at the end that absorbed the matter may expand and force the battery 1000 radially upward (with the non-leaking end being a pivoting end) and at least partially out of its position in the housing 1001 as illustrated by radial movement arrow 1012 to thus disengage the battery 1000 from the contacts 1008, 1010.

Figure 11:
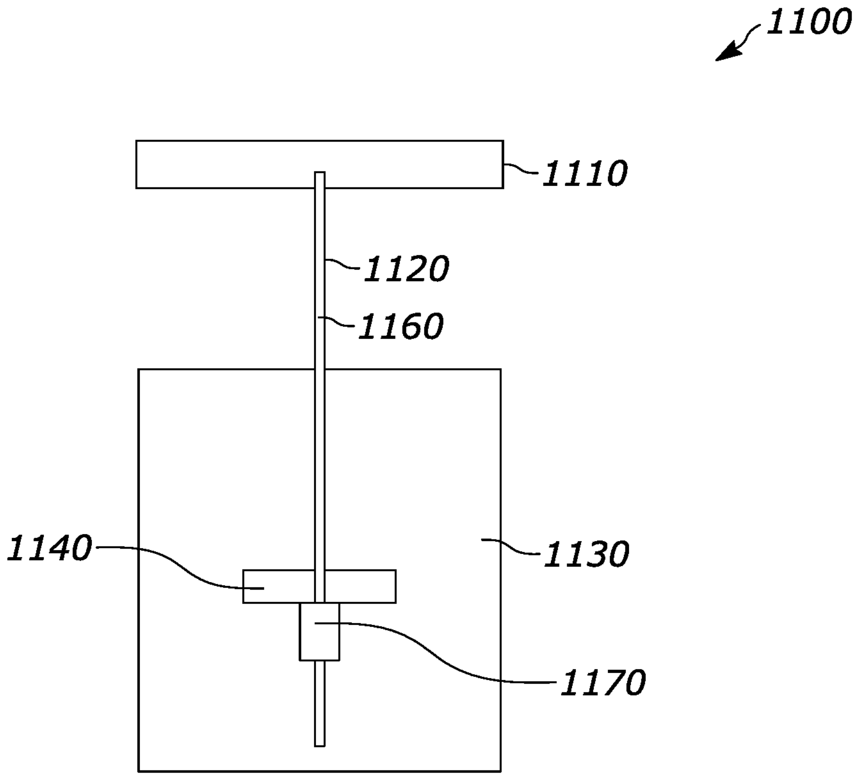
FIGS. 11, 11A, 12, and 12A show a mechanism inside a battery cell that may be used to provide a pop-up indicator of electrolyte leakage and/or to electrically disengage the battery from a device housing the battery consistent with present principles.
Figure 12:
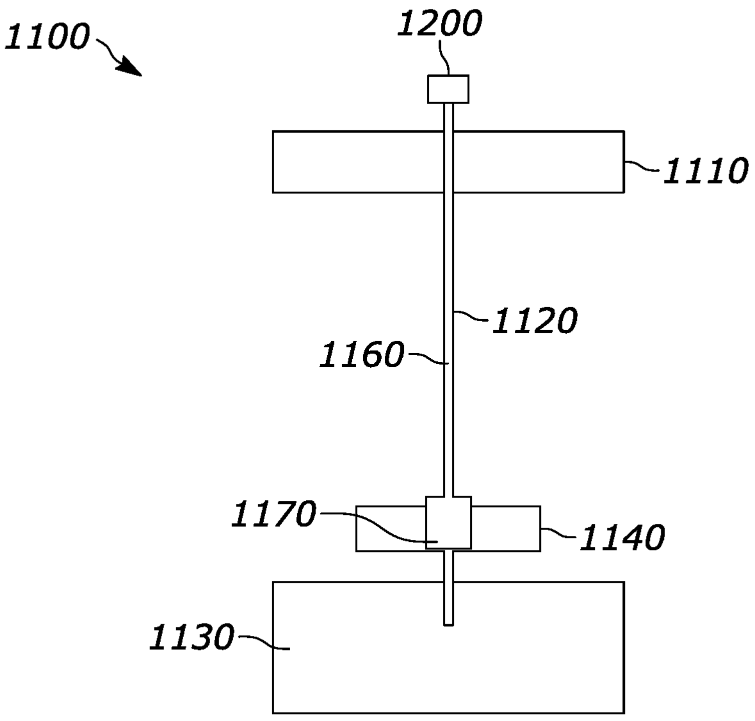
Figure 13:
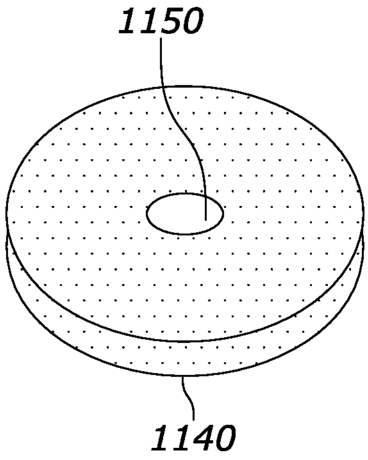
FIG. 13 shows a perspective view of an example element forming part of the mechanism of FIGS. 11 and 12 consistent with present principles.

Continuing the detailed description in reference to FIGS. 11-13, another example implementation is shown that may be used alone or in combination with absorbent material on an exterior surface of a battery casing according to the description above. Thus, according to the example implementation of FIGS. 11-13, a mechanism inside a battery cell may be used to provide a pop-up indicator of electrolyte leakage and/or to electrically disengage one or more of the battery's terminals themselves from the electrical contacts of a device in which the battery is disposed (and powering).

FIG. 11 shows a cutaway side elevational view of this mechanism as disposed within a battery cell of a lead acid and generally rectangular prism-shaped battery 1100, with other portions of the battery 1110 are not shown for clarity. The battery 1100 might be used to power a vehicle such as a car or truck, or bus, for example. But further note that this mechanism may be incorporated into other types of batteries as well, including any of the example types discussed above (e.g., cylindrical batteries, 9-volt batteries, coin batteries, etc.). In any case, as shown in FIG. 11, the mechanism inside the battery's casing 1110 may include a shaft 1120 (such as a plunger or rod) that moves linearly within the casing 1110 based on leakage of matter like electrolyte 1130 from the battery cell to outside the casing 1110. The shaft 1120 may be cylindrical, rectangular prism-shaped, and/or another shape depending on implementation. The shaft 1120 may be rigid and may be composed of aluminum, alloy steel, plastic, hardened rubber, or another suitable material.

Figure 11A:
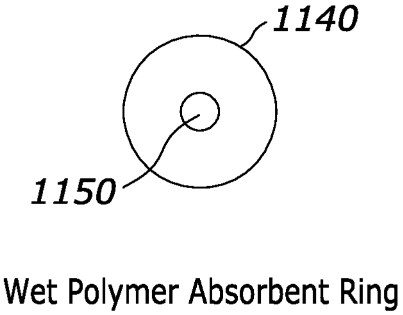

As also shown in FIG. 11 and as further shown in the top plan view of FIG. 11A, the mechanism may also include an element 1140 with an opening 1150 through which the shaft 1120 extends. This element 1140 is also shown by itself in the perspective view of FIG. 13. The element 1140 may be configured to expand the opening 1150 based on the leakage of the electrolyte 1130 to permit the shaft 1120 to move linearly through the opening 1150 and within the casing 1110 based on the leakage. Specifically, the shaft 1120 may have a first width along the first portion 1160 of the shaft 1120 and has a second, larger width along the second portion 1170 of the shaft 1120. The element 1140 may be configured to expand the diameter and/or circumference of the opening 1150 based on the leakage of the electrolyte 1130 (when the element 1140 no longer contacts/interacts with the electrolyte as the electrolyte drains out, resulting in dry expansion of the element 1140) to permit the second portion 1170 to move through the now-expanded opening 1150 to extend a component 1200 of the battery 1100 away from the casing 1110 as shown in FIG. 12. The component 1200 may include, for example, an end portion of the shaft 1120 itself and/or a knob or other structure coupled to the end portion of the shaft (and that has a width wider than the shaft 1120 itself). The component 1200 may be ring-shaped and circumscribe the end portion of the shaft 1120, for example, but may also be rectangular prism-shaped or another shape depending on implementation.

Further note that the element 1140 may itself be ring-shaped as shown or take another shape depending on implementation (e.g., rectangular prism-shaped). Regardless of shape, however, the element 1140 may be established at least in part by a polymer that provides for the aforementioned dry expansion of the diameter and/or circumference of the opening 1150 when the electrolyte drains from around the element 1140/no longer submerges the element 1140 (and/or otherwise provides for dry expansion of other length/width dimensions of the opening if the opening 1150 is formed in a shape other than a cylinder). For example, the element 1140 may be formed by a glass along with a rubber-based matrix, a latex binder, and fibers composite (e.g., polyacrylamide crystals fibers). The element 1140 may thus expand as the electrolyte drains from out of the casing 1110 and hence out of the pores, chambers, or other inner portions of element 1140 itself. However, other suitable polymer compositions and other compositions and variations may also be used depending on implementation.

Figure 12A:
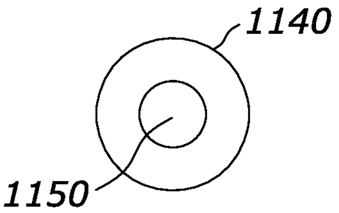

In any case, as mentioned above, owing to this polymer composition, the opening 1140 may have a first circumference/size as shown in FIG. 11A when submerged in and absorbing the electrolyte 1130, but may have a second, larger circumference/size as shown in FIG. 12A when electrolyte leaks out of the battery cell to the point where the element 1140 is only partially submerged or no longer submerged in the electrolyte. These features are illustrated further through the "wet polymer absorbent ring" designation shown in FIG. 11A and the "dry polymer absorbent ring" designation shown in FIG. 12A.

Thus, the opening 1150 may be configured so that the second portion 1170 cannot pass through the opening 1150 prior to the opening's dry expansion based on the leakage of the electrolyte 1130 (e.g., a top surface of the second portion 1170 may abut portions of the element 1140 around the opening 1150 prior to the opening's expansion), but owing to this dynamic enlarging of the opening 1150 as electrolyte leaks out of the battery 1110, the opening 1150 once enlarged permits the portion 1170 to pass through the opening 1150 to thus allow the shaft 1120 to move therethrough and extend the component 1200 of the battery 1100 externally away from the casing 1110 as shown in FIG. 12. This movement may also be due to the portion 1170 (and/or other portions of the shaft 1120 including the portion 1160 or other components coupled thereto) being made of material that is buoyant in battery electrolyte. Additionally or alternatively, the portion 1170 (and/or other portions of the shaft 1120) may also be hollow on the inside to create sufficient buoyancy to move the portion 1170 through the expanded opening 1150. Thus, the portion 1170 may float up and through the opening 1150 to extend the component 1200 of the battery 1110 away from the casing 1110 as shown in FIG. 12.

However, further note that in other example embodiments, rather than the portion 1170 abutting portion of the element 1140 until the expansion of the opening 1150, the portion 1170 may have the same width as other portions of the shaft 1120 (such as the portion 1160) and instead establish an interference fit with the opening 1150 prior to the opening's expansion based on the leakage of the electrolyte 1130. Here, the interference fit still prevents movement of the shaft 1120 within the casing 1110 until the opening 1150 expands based on the leakage and, owing to the shaft 1120 still being buoyant in electrolyte as discussed above, the shaft 1120 may still move linearly upwards within the casing 1110 to extend the component 1200 of the battery 1110 up and away from the casing 1110.

Figure 14:
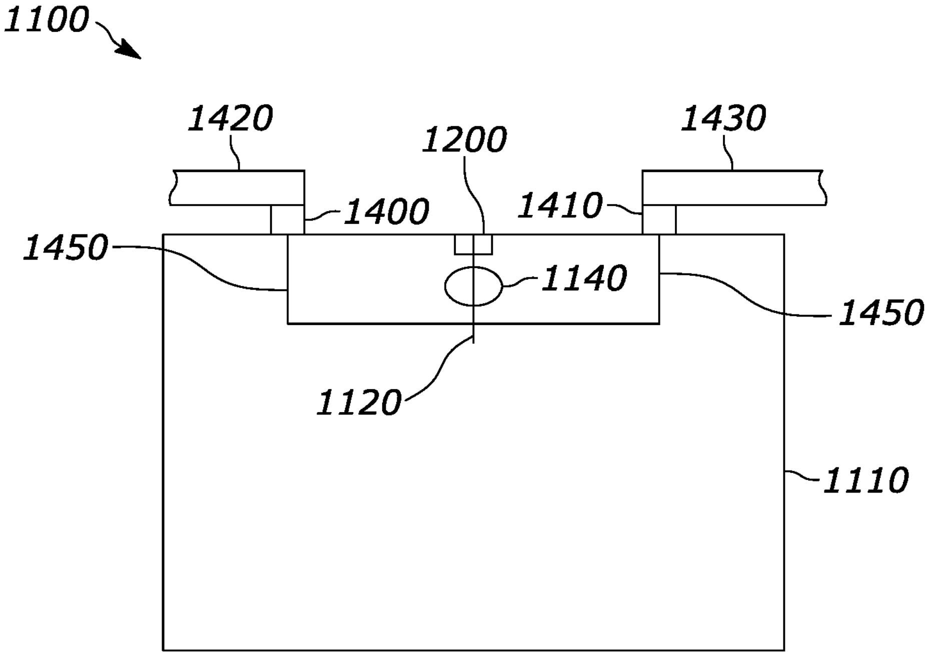
FIGS. 14-16 show the mechanism inside and operating within a rectangular prism-shaped battery consistent with present principles.
Figure 15:
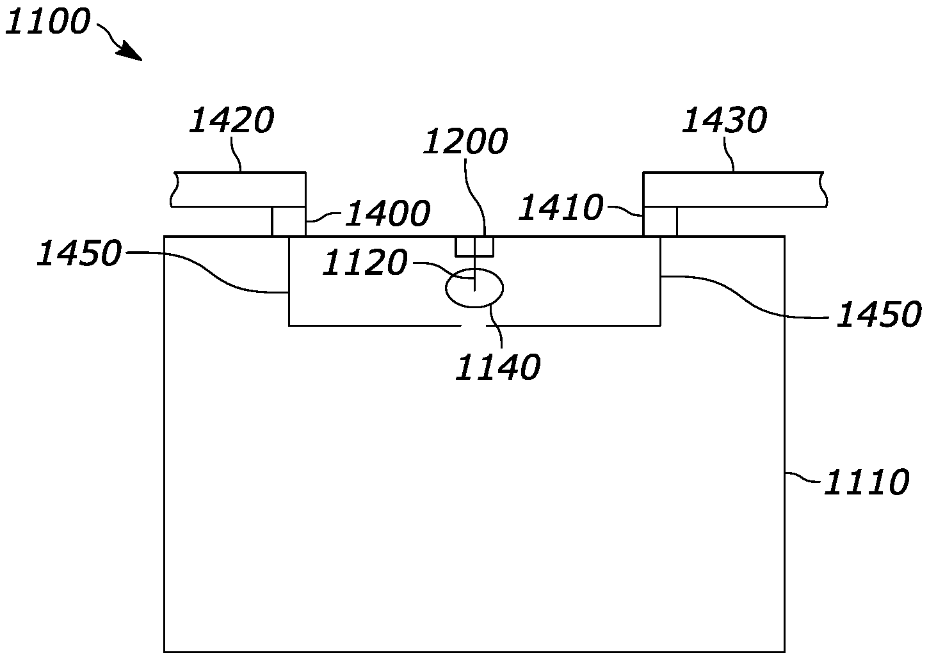

This movement is further illustrated in the side elevational views of the battery 1100 as shown in FIGS. 14 and 15, with certain portions of the mechanism (including the shaft 1120 and element 1140) as located inside one of the cells of the battery 1100 shown in cutaway view. FIG. 14 shows the battery 1100 with respective positive and negative terminals 1400, 1410 as engaged with respective positive and negative electrical connectors/contacts 1420, 1430 of a vehicle prior to electrolyte leakage, and hence the component 1200 is still inside the casing or at least flush with it. FIG. 15 then shows the battery 1100 where the component 1200 has extended vertically away and is distanced from the casing 1110 based on electrolyte leakage and hence movement of the shaft through the opening 1150 as discussed above. Thus, per FIG. 15, once extended the component 1200 with its relatively greater width than the shaft 1120 itself may establish a visual indicator appreciable from outside the casing 1110 without deconstructing the battery, indicating a battery malfunction to the observer. In some examples, the component 1200 may also the bear red coloring to indicate the battery malfunction (with other portions of the shaft 1120 having a different color for contrast, such as silver or white, or another grayscale color).

Also, per FIGS. 14 and 15, it is to be understood that in addition to the movement of shaft 1120 extending the component 1200 away from the casing 1110 to serve as a visual indicator of electrolyte leakage, the shaft 1120 may also be configured to electrically disengage the battery 1100 from the vehicle or other device based on the movement of the shaft 1120 based on the electrolyte leakage (e.g., by breaking the path of current as provided from the battery 1100 to the vehicle). FIGS. 14 and 15, therefore, show one example where electrical lines 1450 forming part of the battery's power/charge circuit help form a complete circuit, with the electrically conductive shaft 1120 occupying part of the complete circuit. However, as shown in FIG. 15, once the shaft 1120 moves upward based on electrolyte leakage, at least part of the shaft 1120 moves out of the circuit and therefore ceases forming part of the circuit itself, breaking the current path and rendering the circuit incomplete and battery 1100 inoperable, thus effectively electrically disengaging the battery 1100 from the vehicle.

Figure 16:
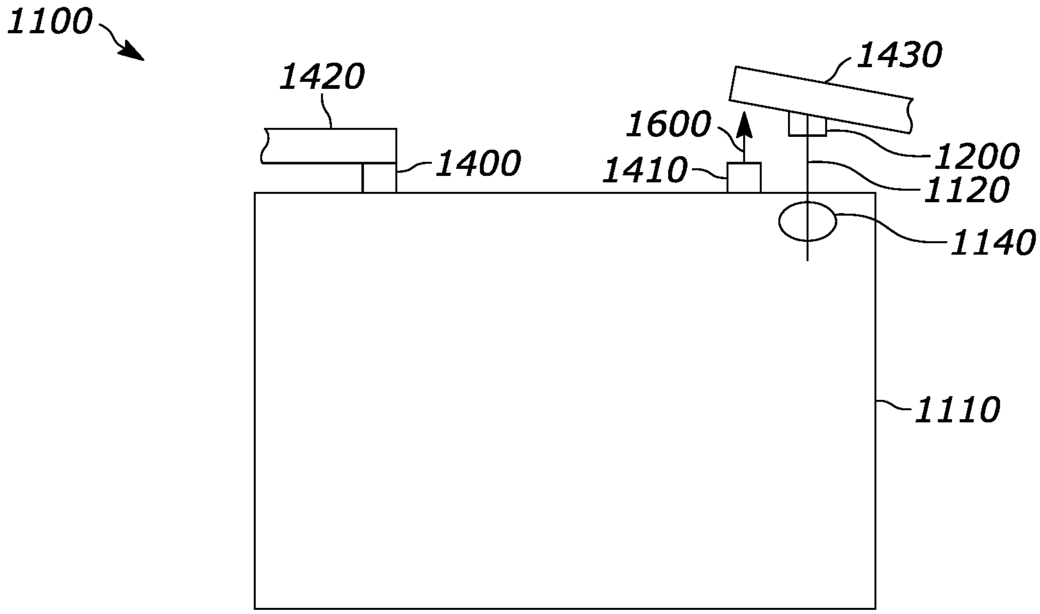

FIG. 16 then shows another example where the mechanism with shaft 1120 has been mounted at another location within the battery 1100 so that, upon extension of the shaft 1120, the shaft 1120 and/or component 1200 may exert upward force on the contact 1430 as shown by arrow 1600 to thus physically disengage (and electrically disengage) the terminal 1410 from the contact 1430, electrically disengaging the battery 1100 from powering the vehicle or other device itself. If desired, in some examples another shaft 1120/element 1140-based mechanism may also be located on the other side of the battery 1100 to also physically force the contact 1420 away from the terminal 1400. But if only one mechanism is used, it is to be understood that the mechanism may be disposed proximate to the positive terminal of the battery 1100 to at least disengage the positive terminal from the positive electrical contact.

Figure 17:
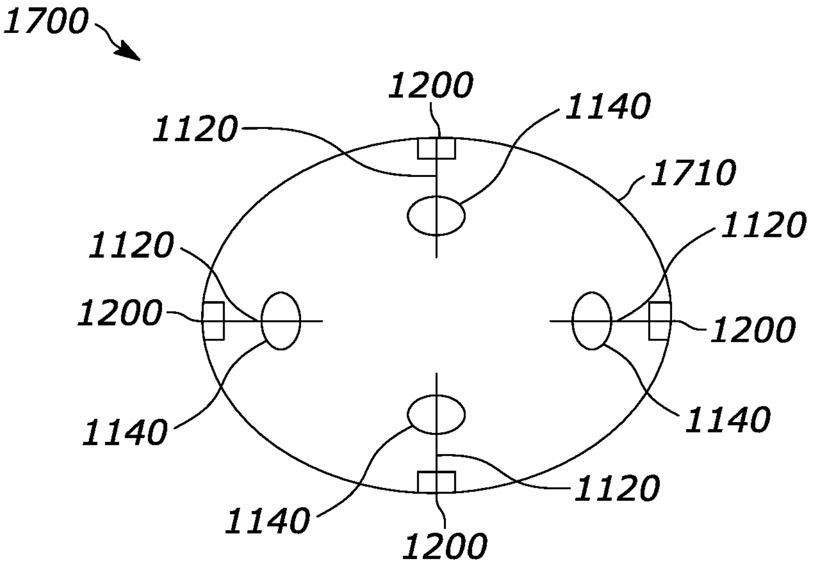
FIG. 17 shows the mechanism inside and operating within a cylindrical battery consistent with present principles.

FIG. 17 shows another example implementation using the mechanism of FIGS. 11-13, but for a cylindrical battery rather than a rectangular prism-shaped battery. FIG. 17 thus shows a transverse cross-sectional view of a battery 1700 (relative to the battery's longitudinal axis), with plural of these mechanisms disposed within so that upon electrolyte leakage and regardless of in which radial orientation the battery 1700 is placed within a battery housing of a device, a respective component 1200 may extend straight upward or at least obliquely upward but still away from the casing 1710 of the battery 1700 based on electrolyte leakage and buoyancy of the respective shaft 1120. Further note that additional, similar mechanisms may also be configured at the ends of the cylindrical battery 1700 as well so that a respective component 1200 may extend away from the battery casing in a direction parallel to the longitudinal axis of the cylindrical battery if the battery is vertically oriented upright or upside down along its longitudinal axis within a device. Further note that here too each of the mechanisms in the battery 1700 may be configured so that movement of the respective shaft 1120 may break a current path/circuit of the battery 1700 itself, similar to as set forth above for the rectangular prism-shaped battery, again rendering the battery 1700 inoperable and unable to power the device itself.

Figure 18A:
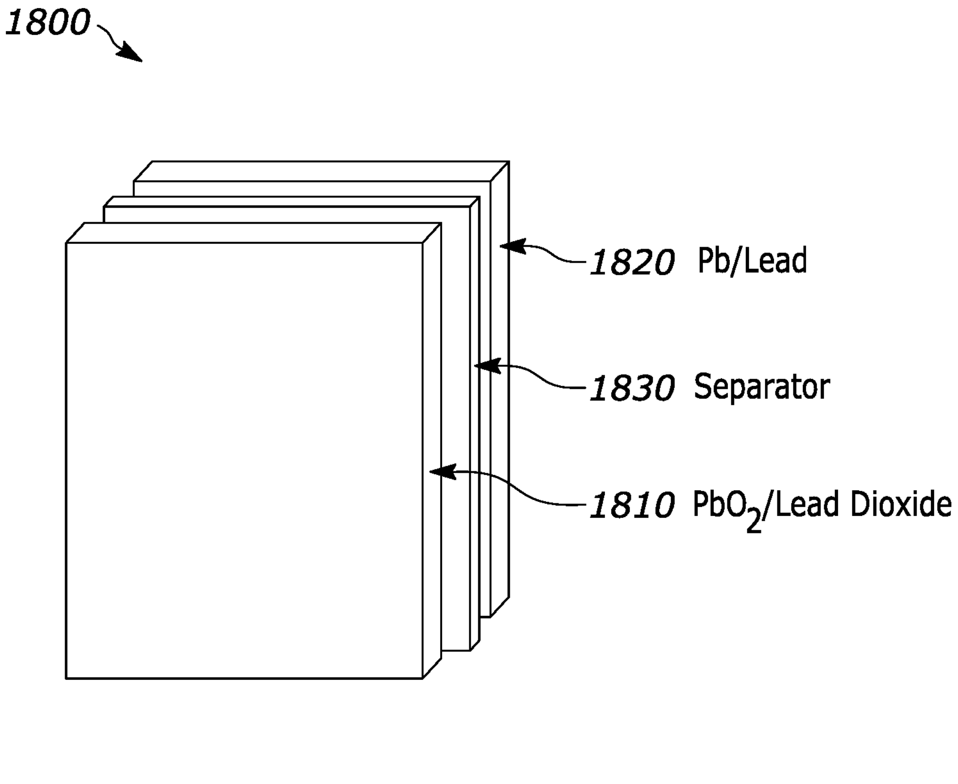
FIGS. 18A and 18B show various stages of assembly/disassembly of a lead acid vehicle battery for illustration consistent with present principles.
Figure 18B:
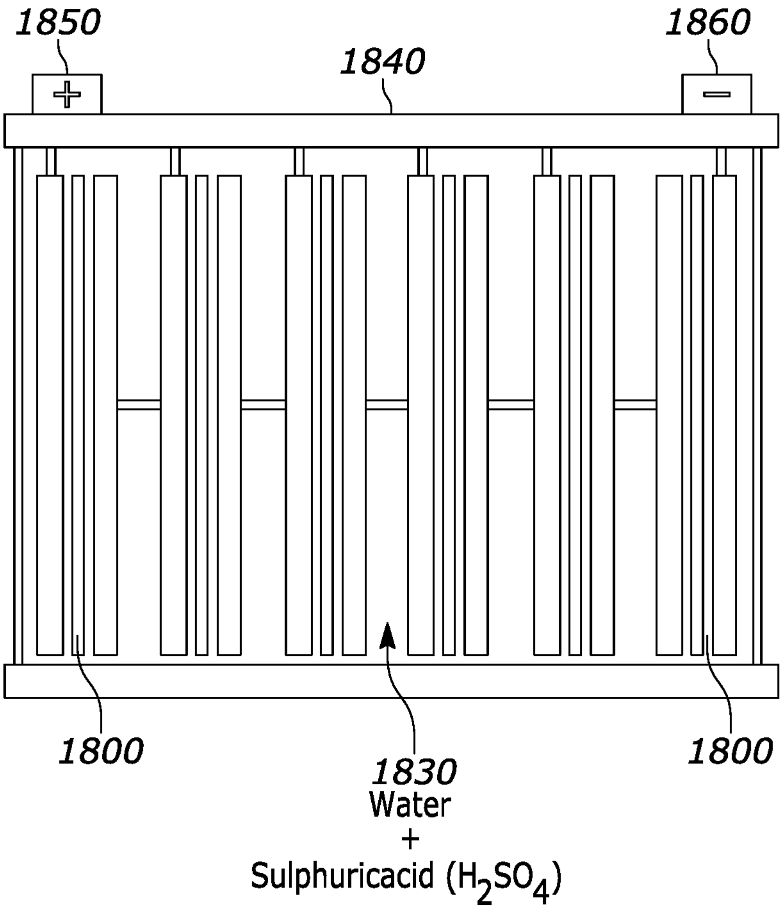

Turning now to FIGS. 18A and 18B, they show an example makeup of an example lead acid battery cell 1800 that may be used consistent with present principles, with portions thereof spaced apart in FIG. 18A for illustration. FIG. 18A thus illustrates that an example lead acid battery may be built with several individual cells (including a respective cell 1800), each containing layers of lead alloy plates 1810, 1820. Lead alloy plate 1820 (Pb) may be used for the anode, while lead alloy plate 1810 (PbO2) may be used for the cathode. FIG. 18B then shows the plates 1810 and 1820 of each respective cell 1800 immersed in an aqueous electrolyte solution 1830 and encased in a battery casing 1840. The solution 1830 may, in certain specific non-limiting implementations, be made of 35% sulfuric acid (H2SO4) and 65% water (H2O), though that ratio may vary if desired (e.g., with H2O still establishing a majority of the electrolyte solution). Positive and negative terminals 1850 and 1860 are also shown in communication with the cells 1800 themselves in FIG. 18B, with the cells 1800 also in electrical communication with each other.

Figure 19A:
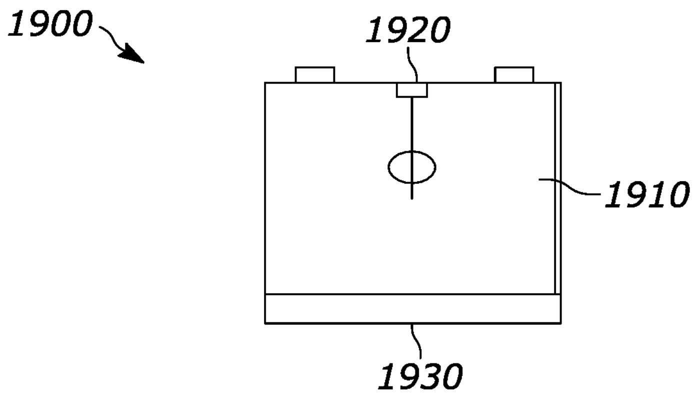
FIGS. 19A and 19B show an example lead acid battery that includes both the external absorbent material and internal mechanism consistent with present principles.
Figure 19B:
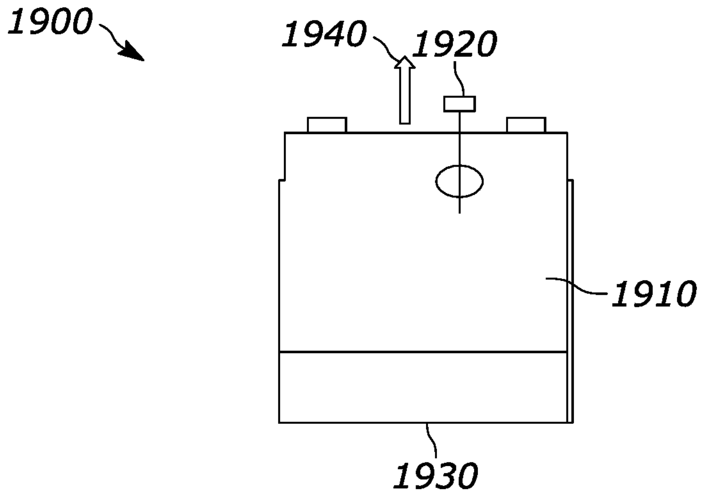

Now in reference to FIGS. 19A and 19B, an example rectangular prism-shaped battery 1900 is shown that includes an electrolyte-absorbent material 1910 coupled to an exterior of the battery's casing 1910 per FIGS. 2-10B for wet expansion of the material 1910 outside the battery 1900 as described above. The battery 1900 may also include a mechanism 1920 per FIGS. 11-17 inside a cell of the battery for dry expansion of different material inside the battery 1900, with the mechanism including a shaft that moves within the casing 1910 based on leakage of matter from the battery's cell(s) to outside the casing 1910 as described above. Thus, these two aspects may be combined to provide for even greater safety and potentially even earlier electrolyte leak detection (further minimizing potential damage to the device in which the battery 1900 is disposed and also further minimizing potential health hazards to the user).

FIG. 19A shows the battery 1900 under normal operating conditions where no electrolyte has leaked out of the battery 1900, and the battery 1900 is not malfunctioning.

In contrast, FIG. 19B shows the battery 1900 when it malfunctions and electrolyte begins leaking out of the battery. The absorbent material 1910 may force the battery 1900 up and at least partially out of its housing 1930 as illustrated by arrow 1940, while the same electrolyte leakage also actuates the mechanism 1920 to pop up out of the casing 1910 to serve as an indicator and possibly break a current path of the internal battery circuit to cut the battery 1900 off from being able to power the device itself consistent with present principles.

It is to be understood that while present principals have been described with reference to some example embodiments, these are not intended to be limiting and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. An apparatus, comprising:

a battery, the battery comprising:

at least one battery cell;

a casing housing the at least one battery cell; and a mechanism inside the casing, the mechanism comprising a shaft that moves within the casing based on leakage of matter from the battery cell to outside the casing, wherein the shaft has a first width along a first portion of the shaft and has a second width along a second portion of the shaft, the second width being larger than the first width;

wherein the mechanism comprises an element with an opening through which the shaft extends, the element configured to expand the opening based on the leakage to permit the second portion to move within the casing to extend a component of the battery away from the casing based on the leakage.

2. The apparatus of claim 1, wherein the shaft is configured to electrically disengage the battery from a device based on movement of the shaft based on the leakage.

3. The apparatus of claim 1, wherein the component as extended away from the casing establishes a visual indicator appreciable from outside the casing without deconstructing the battery.

4. The apparatus of claim 3, wherein the visual indicator indicates a battery malfunction.

5. The apparatus of claim 4, wherein the component as extended away from the casing bears red coloring to indicate the battery malfunction.

6. The apparatus of claim 1, wherein the second portion cannot pass through the opening prior to the opening's expansion based on the leakage.

7. The apparatus of claim 6, wherein the second portion abuts the element around at least a portion of the opening prior to the opening's expansion based on the leakage.

8. The apparatus of claim 1, wherein prior to the opening's expansion based on the leakage the opening establishes an interference fit with the shaft, the interference fit preventing movement of the shaft within the casing, and wherein based on the opening's expansion based on the leakage the shaft moves within the casing.

9. The apparatus of claim 1, wherein the element is ring-shaped.

10. The apparatus of claim 1, wherein the element is established at least in part by a polymer.

11. The apparatus of claim 1, wherein the matter comprises electrolyte.

12. The apparatus of claim 1, comprising a device that houses the battery.

13. An apparatus, comprising:

a mechanism configured for disposition within a battery, the mechanism comprising a shaft configured to move within a casing of the battery based on leakage of matter from a battery cell to outside the casing;

wherein the mechanism comprises a ring-shaped element with an opening through which the shaft extends, the ring-shaped element configured to expand the opening based on the leakage to permit the shaft to move within the casing based on the leakage.

14. The apparatus of claim 13, wherein an end portion of the shaft is configured with an indicator of electrolyte leakage.

15. A method, comprising:

providing a battery comprising at least one battery cell and a casing housing the at least one battery cell; and providing a pop up mechanism inside the casing, the pop-up mechanism comprising a shaft that moves within the casing based on leakage of matter from the battery cell to outside the casing;

wherein the shaft has a first width along a first portion of the shaft and has a second width along a second portion of the shaft, the second width being larger than the first width; and wherein the mechanism comprises an element with an opening through which the shaft extends, the element configured to expand the opening based on the leakage to permit the second portion to move within the casing to extend a component of the battery away from the casing based on the leakage.

16. The method of claim 15, wherein the element is ring-shaped.

17. The apparatus of claim 13, wherein the shaft has a first width along a first portion of the shaft and has a second width along a second portion of the shaft, the second width being larger than the first width, the ring-shaped element configured to expand the opening based on the leakage to permit the second portion to move within the casing to extend a component of the battery away from the casing.

18. The apparatus of claim 17, wherein the second portion cannot pass through the opening prior to the opening's expansion based on the leakage.

19. The apparatus of claim 18, wherein the second portion abuts the ring-shaped element around at least a portion of the opening prior to the opening's expansion based on the leakage.

20. The apparatus of claim 13, wherein prior to the opening's expansion based on the leakage the opening establishes an interference fit with the shaft, the interference fit preventing movement of the shaft within the casing, and wherein based on the opening's expansion based on the leakage the shaft moves within the casing.

* * * * *